United States Patent
Bellamkonda et al.

(10) Patent No.: US 11,650,991 B2
(45) Date of Patent: May 16, 2023

(54) EFFICIENT OPTIMIZATION OF SQL QUERIES HAVING SET OPERATORS WITH A MULTI-SET SEMANTIC

(71) Applicant: Oracle International Corporation, Redwood Shores, CA (US)

(72) Inventors: Srikanth Bellamkonda, Mountain View, CA (US); Yu Su, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/107,874

(22) Filed: Nov. 30, 2020

(65) Prior Publication Data
US 2022/0171774 A1 Jun. 2, 2022

(51) Int. Cl.
*G06F 16/242* (2019.01)
*G06F 16/2455* (2019.01)
*G06F 16/22* (2019.01)
*G06F 16/248* (2019.01)

(52) U.S. Cl.
CPC ........ *G06F 16/2456* (2019.01); *G06F 16/221* (2019.01); *G06F 16/2282* (2019.01); *G06F 16/244* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 5,696,960 A | 12/1997 | Bhargava et al. | |
| 2003/0055814 A1 | 3/2003 | Chen et al. | |
| 2007/0192297 A1 | 8/2007 | Shriraghav et al. | |
| 2013/0006960 A1 | 1/2013 | Barbas | |
| 2015/0220600 A1* | 8/2015 | Bellamkonda | G06F 16/2456 707/747 |
| 2017/0046386 A1 | 2/2017 | Kirk et al. | |

FOREIGN PATENT DOCUMENTS

WO WO2014070162 5/2014

OTHER PUBLICATIONS

Hernandez, "Summarizing Data Using the Groupingsets Operator," Nov. 14, 2017 (Year: 2017).*
Harrison, Optimizing Group and Order by Aug. 5, 2009 (Year: 2009).*
Aschenbrenner, "Intersect All in SQL Server," Feb. 16, 2015 (Year: 2015).*
Oracle, "Database Data Warehousing Guide," Year 2013 (Year: 2013).*
"Fullselect," IBM Documentation, Copyright 2021 IBM Corporation, URL: https://www.ibm.com/support/knowledgecenter/en/SSEPEK_11.0.0/sqlref/src/tpc/db2z_sql_fullselect.html.
(Continued)

*Primary Examiner* — Yu Zhao
(74) *Attorney, Agent, or Firm* — Vista IP Law Group, LLP

(57) ABSTRACT

Disclosed is a system, method, and computer program product to efficiently process multi-set operations in a database system. An approach is described to perform a group-by operation with a counter to efficiently process such queries. Techniques are described to optimize multi-set operations into regular-set operations.

21 Claims, 32 Drawing Sheets

(56) References Cited

OTHER PUBLICATIONS

Aschenbrenner, K., "Intersect All in SQL Server," SQLPassion, dated Feb. 16, 2015, URL: https://www.sqlpassion.at/archive/2015/02/16/intersect-sql-server-2/.

Konieczny, B., "Apache Spark 2.4.0 features—Except All and Intersect All," Apache Spark SQL, WaitingForCode.com, dated Mar. 21, 2019, URL: https://www.waitingforcode.com/apache-spark-sql/apache-spark-2.4.0-features-except-all-intersect-all/read.

Green, T., "Bag Semantics," Encyclopedia of Database Systems, SpringerLink, date found via Internet Archive as Jun. 2, 2018, URL: https://link.springer.com/referenceworkentry/10.1007%2F978-0-387-39940-9_979.

* cited by examiner

Table T1

| A | B |
|---|---|
| 1 | 2 |
| 1 | 3 |
| NULL | 3 |
| 1 | 3 |
| 6 | 5 |
| NULL | 5 |

Table T2

| A | B |
|---|---|
| 1 | 3 |
| 3 | 3 |
| 4 | 4 |
| 5 | 5 |
| NULL | 4 |

SELECT B FROM T1
INTERSECT SELECT B FROM T2;

| B |
|---|
| 3 |
| 5 |

← 302

SELECT B FROM T1
INTERSECT ALL SELECT B FROM T2;

| B |
|---|
| 3 |
| 3 |
| 5 |

Table T1

| A | B |
|---|---|
| 1 | 2 |
| 1 | 3 |
| NULL | 3 |
| 1 | 3 |
| 6 | 5 |
| NULL | 5 |

Table T2

| A | B |
|---|---|
| 1 | 3 |
| 3 | 3 |
| 4 | 4 |
| 5 | 5 |
| NULL | 4 |

Fig. 4A

Table T1

| A | B |
|---|---|
| 1 | 2 |
| 1 | 3 |
| NULL | 3 |
| 1 | 3 |
| 6 | 5 |
| NULL | 5 |

→ Perform sort group-by operation

Table T2

| A | B |
|---|---|
| 1 | 3 |
| 3 | 3 |
| 4 | 4 |
| 5 | 5 |
| NULL | 4 |

→ Perform sort group-by operation

Fig. 4B

Table T1

| A | B |
|---|---|
| 1 | 2 |
| 1 | 3 |
| NULL | 3 |
| 1 | 3 |
| 6 | 5 |
| NULL | 5 |

→ Perform sort group-by operation →

| B | Count (N1) |
|---|---|
| 2 | 1 |
| 3 | 3 |
| 5 | 2 |

Table T2

| A | B |
|---|---|
| 1 | 3 |
| 3 | 3 |
| 4 | 4 |
| 5 | 5 |
| NULL | 4 |

→ Perform sort group-by operation →

| B | Count (N2) |
|---|---|
| 3 | 2 |
| 4 | 2 |
| 5 | 1 |

Fig. 4C

Table T2

| A | B |
|---|---|
| 1 | 3 |
| 3 | 3 |
| 4 | 4 |
| 5 | 5 |
| NULL | 4 |

Perform sort group-by operation →

| B | Count (N2) |
|---|---|
| 3 | 2 |
| 4 | 2 |
| 5 | 1 |

Table T1

| A | B |
|---|---|
| 1 | 2 |
| 1 | 3 |
| NULL | 3 |
| 1 | 3 |
| 6 | 5 |
| NULL | 5 |

Perform sort group-by operation →

| B | Count (N1) |
|---|---|
| 2 | 1 |
| 3 | 3 |
| 5 | 2 |

Determine Min(N1, N2)

Fig. 4D

Table T2

| A | B |
|---|---|
| 1 | 3 |
| 3 | 3 |
| 4 | 4 |
| 5 | 5 |
| NULL | 4 |

Table T1

| A | B |
|---|---|
| 1 | 2 |
| 1 | 3 |
| NULL | 3 |
| 1 | 3 |
| 6 | 5 |
| NULL | 5 |

Perform sort group-by operation →

| B | Count (N2) |
|---|---|
| 3 | 2 |
| 4 | 2 |
| 5 | 1 |

Perform sort group-by operation →

| B | Count (N1) |
|---|---|
| 2 | 1 |
| 3 | 3 |
| 5 | 2 |

Determine Min(N1, N2) ⇒

- B=2, No value for Table T2
- B=3, Min(3, 2) = 2
- B=4, No value for Table T1
- B=5, Min(2, 1) = 1

Fig. 4E

Table T2

| A | B |
|---|---|
| 1 | 3 |
| 3 | 3 |
| 4 | 4 |
| 5 | 5 |
| NULL | 4 |

Table T1

| A | B |
|---|---|
| 1 | 2 |
| 1 | 3 |
| NULL | 3 |
| 1 | 3 |
| 6 | 5 |
| NULL | 5 |

Perform sort group-by operation →

| B | Count (N2) |
|---|---|
| 3 | 2 |
| 4 | 2 |
| 5 | 1 |

Perform sort group-by operation →

| B | Count (N1) |
|---|---|
| 2 | 1 |
| 3 | 3 |
| 5 | 2 |

Determine Min(N1, N2) ⇒

| B |
|---|
| 3 — 402 |
| 3 — 404 |
| 5 — 406 |

B=3, Min(3, 2) = 2 → 2 Rows

B=5, Min(2, 1) = 1 → 1 Row

Fig. 4F

Table T1

| A | B |
|---|---|
| 1 | 2 |
| 1 | 3 |
| NULL | 3 |
| 1 | 3 |
| 6 | 5 |
| NULL | 5 |

Table T2

| A | B |
|---|---|
| 1 | 3 |
| 3 | 3 |
| 4 | 4 |
| 5 | 5 |
| NULL | 4 |

SELECT A FROM T1
MINUS SELECT A FROM T2;

| A |
|---|
| 6 |

← 502

SELECT A FROM T1
MINUS ALL SELECT A FROM T2;

| A |
|---|
| 1 |
| 1 |
| 6 |
| NULL |

Table T1

| A | B |
|---|---|
| 1 | 2 |
| 1 | 3 |
| NULL | 3 |
| 1 | 3 |
| 6 | 5 |
| NULL | 5 |

Table T2

| A | B |
|---|---|
| 1 | 3 |
| 3 | 3 |
| 4 | 4 |
| 5 | 5 |
| NULL | 4 |

Fig. 6A

Table T1

| A | B |
|---|---|
| 1 | 2 |
| 1 | 3 |
| NULL | 3 |
| 1 | 3 |
| 6 | 5 |
| NULL | 5 |

Perform sort group-by operation →

| A | Count (N1) |
|---|---|
| 1 | 3 |
| 6 | 1 |
| NULL | 2 |

Table T2

| A | B |
|---|---|
| 1 | 3 |
| 3 | 3 |
| 4 | 4 |
| 5 | 5 |
| NULL | 4 |

Perform sort group-by operation →

| A | Count (N2) |
|---|---|
| 1 | 1 |
| 3 | 1 |
| 4 | 1 |
| 5 | 1 |
| NULL | 1 |

Fig. 6C

| Table T1 | |
|---|---|
| A | B |
| 1 | 2 |
| 1 | 3 |
| NULL | 3 |
| 1 | 3 |
| 6 | 5 |
| NULL | 5 |

| Table T2 | |
|---|---|
| A | B |
| 1 | 3 |
| 3 | 3 |
| 4 | 4 |
| 5 | 5 |
| NULL | 4 |

Perform sort group-by operation →

| A | Count (N2) |
|---|---|
| 1 | 1 |
| 3 | 1 |
| 4 | 1 |
| 5 | 1 |
| NULL | 1 |

Perform sort group-by operation →

| A | Count (N1) |
|---|---|
| 1 | 3 |
| 6 | 1 |
| NULL | 2 |

Determine Max(N1-N2, 0)

Fig. 6D

Table T2

| A | B |
|---|---|
| 1 | 3 |
| 3 | 3 |
| 4 | 4 |
| 5 | 5 |
| NULL | 4 |

Perform sort group-by operation →

| A | Count (N2) |
|---|---|
| 1 | 1 |
| 3 | 1 |
| 4 | 1 |
| 5 | 1 |
| NULL | 1 |

Table T1

| A | B |
|---|---|
| 1 | 2 |
| 1 | 3 |
| NULL | 3 |
| 1 | 3 |
| 6 | 5 |
| NULL | 5 |

Perform sort group-by operation →

| A | Count (N1) |
|---|---|
| 1 | 3 |
| 6 | 1 |
| NULL | 2 |

Determine Max(N1-N2, 0) →

602

| A |
|---|
| 1 |  ← 604
| 1 |  ← 606
| 6 |  ← 608
| NULL | ← 610

2 Rows — A=1, Max(3-1,0) = 2
1 Row — A=6, No value for Table T2, so use count for T1
1 Row — A=NULL, Max(2-1,0) = 1

Fig. 6F

EFFICIENT OPTIMIZATION OF SQL QUERIES HAVING SET OPERATORS WITH A MULTI-SET SEMANTIC

BACKGROUND

A query is an expression, command, or set of commands that, when executed, causes a server to perform an operation on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects.

A table is an example database object that stores data in column(s) and row(s). A view is a database object that is defined by an expression, such as a subquery, that references other data object(s), such as table(s). Tables, views, or other data objects may be instantiated from within a query by referencing the data object in the FROM clause. Instantiating a data object in a query causes the data object to be assigned a reference name, such as "T1," "T2," or "EMPLOYEES" for a table, and causes data from the data object to be loaded, often into working memory, for further processing by other operation(s) in the query.

The query may perform operations on data from the source data object(s) on a row-by-row basis as the object(s) are loaded or on the entire source data object(s) after the object(s) have been loaded. A result set generated by some operation(s) may be made available to other operation(s), and, in this manner, the result set may be filtered or narrowed based on some criteria, and/or joined with other result set(s) and/or other source data object(s). A "subquery" is a portion of a query that excludes other portion(s) of the query and that may be evaluated separately from the other portion(s) of the query. The other portion(s) of the query may form an outer query, which may or may not include other subqueries. A subquery nested in the outer query may be separately evaluated one or more times while a result is computed for the outer query.

Example operations that may be performed on the source data object(s) in a query include, but are not limited to, WHERE, GROUP BY, HAVING, SELECT, and ORDER BY. A query processor may evaluate separate operations of the query in a predictable order. For example, the order of precedence may be FROM, WHERE, GROUP BY, HAVING, SELECT, and ORDER BY. Query processors may vary the order if varying the order is predicted to be more efficient as long as the varying the order would not change a result of the query.

Filter predicate(s) may appear in the WHERE clause to remove rows that do not satisfy conditions specified in the filter predicate(s). For example, a filter predicate may remove rows for employees from an employee table that are not in the "marketing" department. Conditions in filter predicate(s) may be related to each other with logical operators such as AND (for "conjunctive predicates") or OR (for "disjunctive predicates"). The "AND" operators connect filter predicates to form a complex filter predicate that is satisfied when both of the connected filter predicates are satisfied. The "OR" operators connect filter predicates to form a complex filter predicate that is satisfied when either or both of the connected filter predicates is satisfied.

"Set operators" are logical operators that operate on a set of discrete items, such as a set of rows. A set operator may include a multi-set semantic to perform operations. In mathematics, a multiset (or bag, or mset) is a modification of the concept of a set that, unlike a set, allows for multiple instances for each of its elements." Examples of operations employing a multi-set semantic includes, for example, the UNION ALL, INTERSECT ALL, and MINUS ALL operations. Unlike a standard UNION operation that returns only distinct rows that appear in the result sets from two or more SELECT statements (queries), the UNION ALL operation does not eliminate duplicate selected rows. A standard INTERSECT operation removes duplicates from a final result set between multiple queries, while the INTERECT ALL operation does not eliminate duplicate rows. The MINUS operation will return unique rows returned by a first query but not the second, while a MINUS ALL operation does not eliminate the duplicated values from the minus operation.

The issue addressed by this document is that the exact manner in which a query having a SET operator with the multi-set semantic is processed will greatly affect the efficiency in which the query will be executed. A naive approach that processes these types of operations in a "brute force" way could significantly and negatively impact the performance of the database system, especially if dealing with a complex query having multiple subqueries with multiple such multi-set operators within the various levels of the subqueries. In fact, this issue is so complex, many database systems do not even offer native functionality to process some or all of these types of set operators having a multi-set semantic.

What is needed, therefore, is a method and/or system that overcomes these issues to efficiently implement processing for set operators with a multi-set semantic in a database system.

SUMMARY

According to some embodiments, a system, method, and computer program product is provided to efficiently process such multi-set operations in a database system. In some embodiments, an approach is described to perform a group-by operation with a counter to efficiently process such queries. In some embodiments, an approach is described to also optimize multi-set operations into regular-set operations.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 3 illustrates example tables and queries for the INTERSECT and INTERSECT ALL operations.

FIGS. 4A-4F illustrate optimized processing according to some embodiments of the invention.

FIG. 5 illustrates example tables and queries for the MINUS and MINUS ALL operations.

FIGS. 6A-6F illustrate optimized processing according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously noted, the exact manner in which a query having a SET operator with the multi-set semantic is processed will greatly affect the efficiency in which the query will be executed. Embodiments of the present invention provide a system, method, and computer program product to efficiently process such multi-set operations in a database system.

Figure 1:
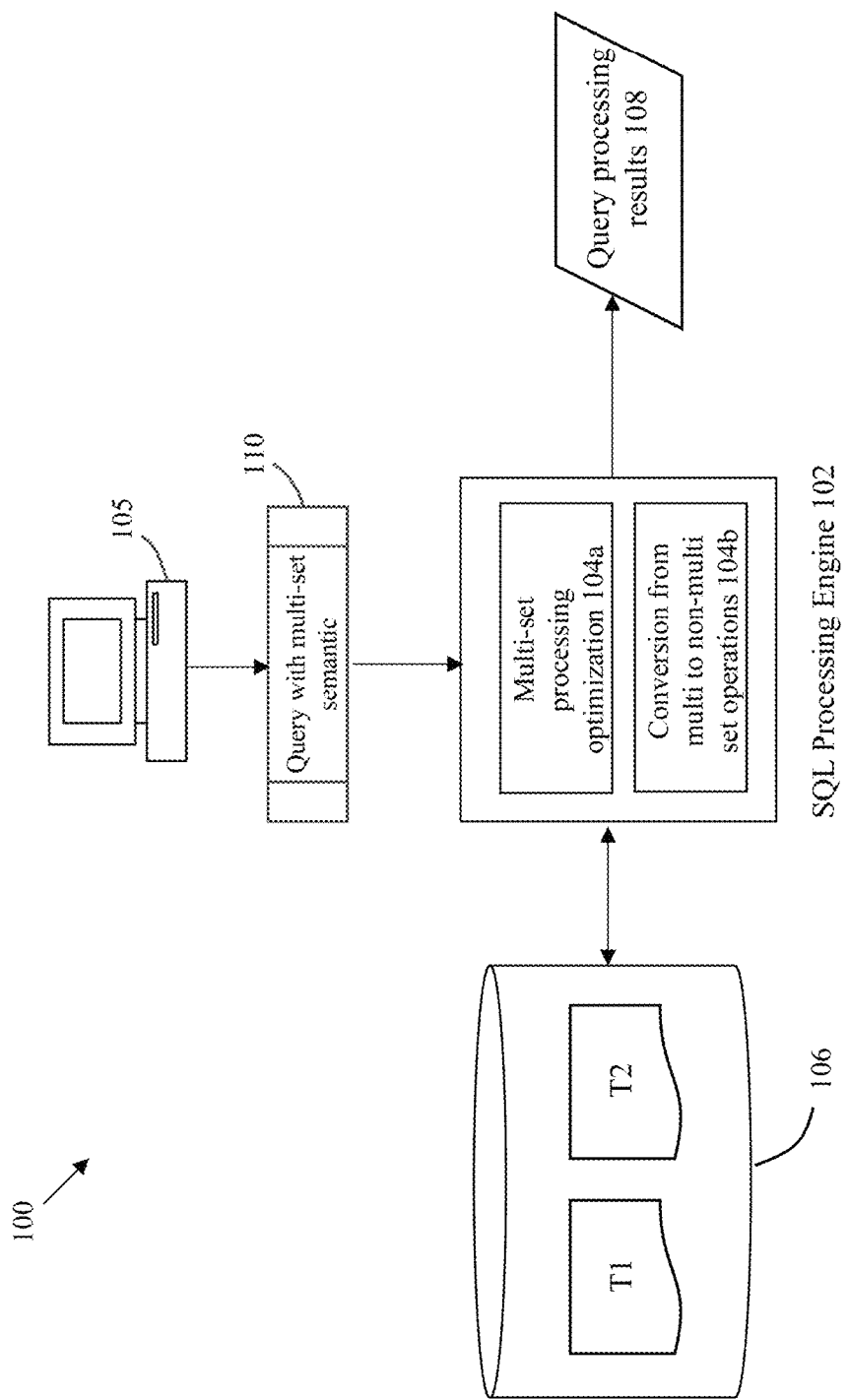
FIG. 1 illustrates a system for implementing some embodiments of the invention.

FIG. 1 illustrates a system 100 for implementing some embodiments of the invention. System 100 includes a database 106 having multiple database tables (e.g., T1 and T2) that are operated upon by one or more users/clients within the system. One or more users/clients operate a user station 105 to issue commands to be processed by the database 106 upon the database tables T1 and/or T2. The user stations and/or the servers that host the database comprises any type of computing device that may be used to implement, operate, or interface with the database 106. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The user/client may issue a database command to interact with database 106, where the database command corresponds to a query 110 having a multi-set semantic. For example, the query 110 may include a set operator having a multi-set sematic to perform operations such as INTERSECT ALL or MINUS ALL.

When a database server receives the original statement of a database command (e.g., from a database application), a SQL processing engine/query processor 102 within the database server must first determine which actions should be performed in response to the database command, and then perform those actions. A query processor 102 may process the database statement to prepare the acts necessary for performance of the desired actions within the database. The initial action to analyze and break the database statement into its constituent parts may be referred to as a "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

With embodiments of the present invention, the query 110 can be efficiently processed by applying a multi-set processing optimization 104a to handle the query. As described in more detail below with respect to FIG. 2, a "group-by" operation is applied to optimally process the query having the multi-set semantic. In addition, optimization 104b may be applied to simplify one or more of the multi-set operations into regular-set operations, e.g., as described further below with respect to FIG. 7. The optimized processing may be applied to the query 110 to generate query processing results 108.

In general, if a query is invoked having the following form "SELECT col1 FROM t1 INTERSECT ALL SELECT col2 FROM t2;", the result should involve all the rows, including duplicates, belonging to both tables t1 and t2. Rows from t1 and t2 are compared based on the SELECT list columns/constants or expressions involving them.

To evaluate this query, the present embodiment performs a GROUP-BY on each input on the SELECT list and maintains a count of number of rows (called counter) for each group defined by the SELECT list expressions (also called keys). Then, the processing gathers the two inputs together. For the same row (e.g., matching key values) from both inputs, an intersection is performed by updating the counter to be the smaller of the counters from the two inputs. Then, the processing will deduplicate the row by producing the row as many times as the counter value.

Figure 2:
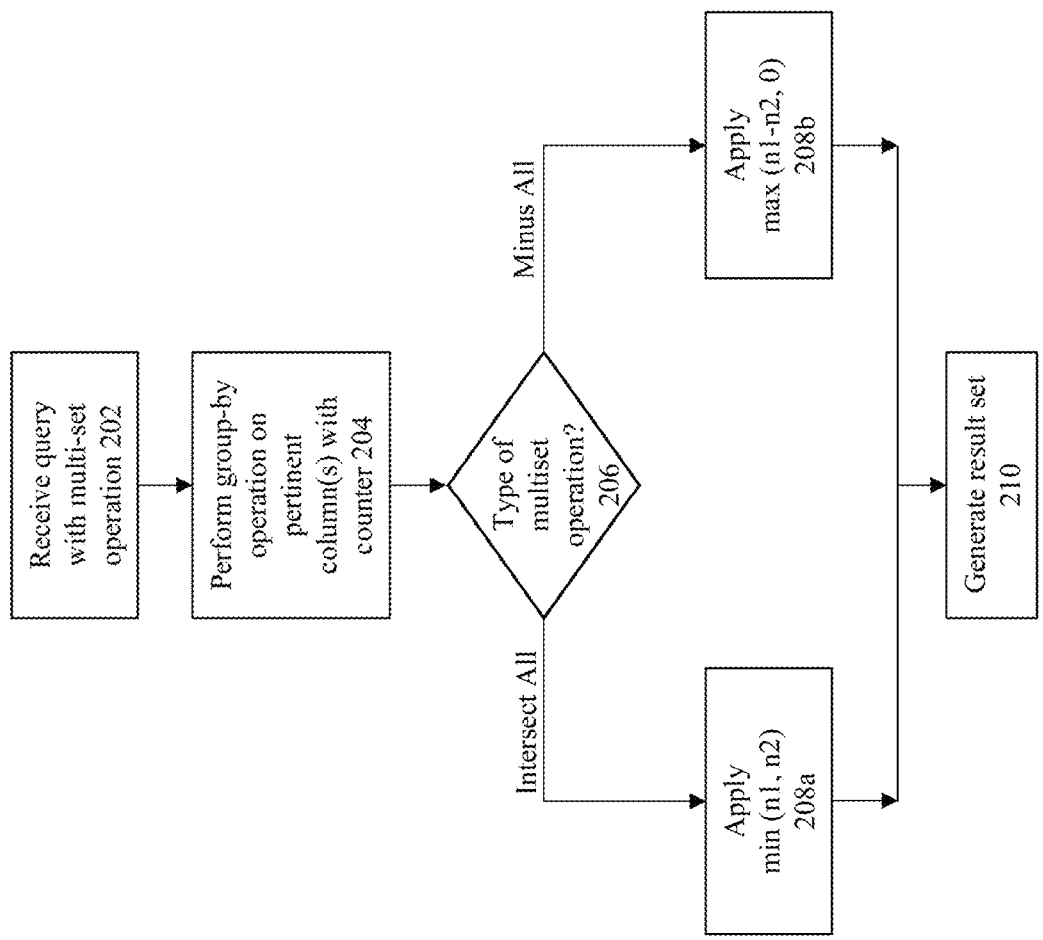
FIG. 2 shows a flowchart of an approach to optimize processing of a query having a SET operator with a multi-set semantic according to some embodiments of the invention.

FIG. 2 shows a flowchart of an approach to optimize processing of a query having a SET operator with the multi-set semantic according to some embodiments of the invention. At 202, the query is received having one or more set operators with a multi-set semantic. For example, the query may include the INTERSECT ALL and/or MINUS ALL operators.

At 204, a "group-by" operation is performed upon one or more columns within the tables of interest. A group-by operation will group rows that have the same values into summary rows. Thus, the group-by operation will serve to group data together based on specific values. The group-by operation is often implemented within a query by using the GROUP-BY statement within the query.

The group-by operation may be implemented in various ways. For example, a "sort group-by" operation not only groups values together, but will also sort the values that has been grouped. In contrast, a "hash group-by" is a hash-based approach to implement the group-by functionality.

In a preferred embodiment of the invention, the "sort group-by" operation is employed at step 204, since this produces sorted lists of values that allows more efficient comparisons and matching between multiple lists. However, in an alternate embodiment, a hash-based group-by operation may also be used as well. If a hash-based operation is employed, then in some embodiments, the results of the group-by operation may be sorted prior to subsequent operations.

A counter is maintained for the results of the group-by operation, e.g., where a results table is produced having one column that holds a value and a second column that holds a counter value for that identified value. For the same row (e.g., matching key values) from both inputs, an intersection is performed by updating the counter to be the smaller of the counters from the two inputs.

At step 206, a determination is made of the type of the multi-set operation that is currently being handled, with the specific downstream actions differing based upon the specific type of operation that is currently being addressed. For example, if the operation is the INTERSECT-ALL operation, then step 208a is applied to generate the result set 210. On the other hand, if the operation is the MINUS ALL operation, then step 208b is applied to generate the result set 210. The processing will deduplicate the value of a row by producing the row as many times as the previously identified counter value.

As an illustrative illustration, consider the tables T1 and T2 shown in FIG. 3. These example tables each includes two columns (column A and column B), which may have been created using the following commands:
CREATE TABLE T1 (col1, varchar(2));
CREATE TABLE T2 (col1, varchar(2));
It is noted that these tables include multiple duplicate values within the rows. For example, in Table T1, column B include multiple copies of the values "3" and "5". Similarly, in Table T2, column B includes multiple copies of the "3" and "4" values.

As previously noted, the INTERSECT ALL operator takes two inputs and returns rows that appear in both result sets while preserving duplicity. INTERSECT, on the other hand, removes duplicate rows from the final result.

The following is an example query against column B that includes the non-multi-set operation INTERSECT:
SELECT B FROM T1
INTERSECT SELECT B FROM T2;
This query is directed to column B in both tables T1 and T2, and seeks to obtain results from performing the INTERSECT operation upon this column in both tables. The results 302 from performing this query are shown in FIG. 3. Even though multiple values of "3" intersect between column B in the two tables T1 and T2, only a single value of "3" is presented in results 302 due to the INTERSECT operation.

In contrast, consider the following is an example query against column B that includes a multi-set operation INTERSECT ALL:
SELECT B FROM T1
INTERSECT ALL SELECT B FROM T2;
This query is directed to column B in both tables T1 and T2, and seeks to obtain results from performing the INTERSECT ALL operation upon this column in both tables.

The results 304 from performing this query are shown in FIG. 3. Here, both the intersections of the value "3" between tables T1 and T2 are shown in results 304, hence the two rows that show "3" in results 304.

FIGS. 4A-4F illustrate how these results 304 from performing the above INTERSECT ALL operation can be obtained with optimized processing according to the current embodiment of the invention. FIG. 4A reproduces the two table T1 and T2 that were previously introduced in FIG. 3. Each of table T1 and T2 includes two columns (column A and column B). For the purpose of explaining FIGS. 4A-F, this illustrative example will focus on column B since the example query is directed to column B.

As shown in FIG. 4B, a sort group-by operation is applied to the pertinent column in each table. The results from performing this operation upon column B in each table is shown in FIG. 4C, along with a counter value for each of the column values. In particular, the values in column B are identified and grouped together into a first column, while a counter value for the identified/grouped values are placed into a second column.

For column B in table T1, there is one appearance of the value "2", and thus the results for this table includes a row for value "2" having a counter value of "1". There are three appearances of the value "3", and thus the results include a row for value "3" having a counter value of "3". There are two appearances of the value "5", and thus the results include a row for value "5" having a counter value of "2". The counter values within the results table for T1 are referred to herein as N1.

For column B in table T2, there are two appearance of the value "3", and thus the results for this table T2 includes a row for value "3" having a counter value of "2". There are two appearances of the value "4", and thus the results include a row for value "4" having a counter value of "2". There is one appearance of the value "5", and thus the results include a row for value "5" having a counter value of "1". The counter values within the results table for T2 are referred to herein as N2.

The results of the sort group-by operations are then analyzed against each other to determine the final results of the INTERSECT ALL operation. As illustrated in FIG. 4D, the operation Minimum (N1, N2) is applied to each row within the two results tables to determine the final results.

FIG. 4E illustrates the calculations from applying the Min(N1, N2) operation for the values for each table, and FIG. 4F shows the final results from applying the calculations and then deduplicating the values based upon the calculation results. Here, for values "2" and "4" in column B, these values do not exist in both tables. For example, value "2" exists in table T1 but does not exist in table T2. Similarly, value "4" exists in table T2 but does not exist in table T1. As such, these values would not be represented in the final result set 402.

For value "3" in column B, N1 is "3" and N2 is "2". The operation Min(3, 2) produces a result value of "2". This means that the value "3" should be reproduced twice in the final result set 402. Here, the final result set 402 include two rows 404 that hold this value "3".

For a value "5" in column B, N1 is "2" and N2 is "1". The operation Min(2, 1) produces a result value of "1", which means that the value "5" is reproduced just once in the final result set 402. As such, the final result set 402 include one row 406 that hold this value "5".

Similar processing to the above may also be applied to handle the MINUS ALL operation. Again, GROUP-BY is performed on both the inputs with counters (count of number of rows with a given key values). Then, the processing gathers data from both inputs to perform MINUS ALL. If a row is in the first input but not in the second input, it will be part of the result. The row will be deduplicated as many times as the counter.

To illustrate, consider FIG. 5 which reproduces table T1 and T2, but assume that column A from these table will be addressed to handle the MINUS and MINUS ALL operations. The following is an example query against column A that includes the non-multi-set operation MINUS:

SELECT A FROM T1
MINUS SELECT A FROM T2;

This query is directed to column A in both tables T1 and T2, and seeks to obtain results from performing the MINUS operation between this column from both tables. The results 502 from performing this query are shown in FIG. 5. Because duplicated values are consolidated together for this operation, this means that only the value "6" is included in the results.

In contrast, consider the following is an example query against column B that includes a multi-set operation MINUS ALL:

SELECT A FROM T1
MINUS ALL SELECT A FROM T2;

This query is directed to column A in both tables T1 and T2, and seeks to obtain results from performing the MINUS ALL operation upon this column in both tables. The results 504 from performing this query are shown in FIG. 5. Here, since duplicated values are not consolidated prior to the MINUS operation, this means that the final results will include two rows having the "1" value, one row having the "6" value, and one row having the "NULL" value.

Figure 6B:
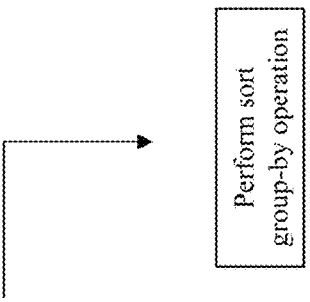
Figure 6B:
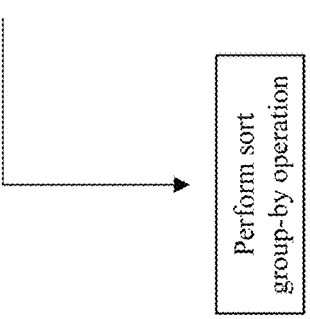

FIGS. 6A-6F illustrate how these results 304 from performing the above MINUS ALL operation can be obtained with optimized processing according to the current embodiment of the invention. FIG. 6A reproduces the two table T1 and T2 that were previously introduced. Each of table T1 and T2 includes two columns (column A and column B). For the purpose of explaining FIGS. 6A-F, this illustrative example will focus on column A since the example query is directed to column A.

As shown in FIG. 6B, a sort group-by operation is applied to column A in each table. The results from performing this operation upon column A in each table is shown in FIG. 6C. In particular, the values in column A are identified and grouped together into a first column, while a counter value for the identified/grouped values are placed into a second column.

For column A in table T1, there are two appearances of the value "NULL", and thus the results for this table includes a row for value "NULL" having a counter value of "2". There are three appearances of the value "1", and thus the results include a row for value "1" having a counter value of "3". There is one appearance of the value "6", and thus the results include a row for value "6" having a counter value of "1". The counter values within the results table for T1 are referred to herein as N1.

For column A in table T2, there is one appearance of the value "NULL", and thus the results for this table T2 includes a row for value "NULL" having a counter value of "1". There is one appearance for each of the values "1", "3", "4", and "5". Therefore, the results include a row for each of these values, with each row having a counter value of "1".

The results of the sort group-by operations are then analyzed against each other to determine the final results of the MINUS ALL operation. As illustrated in FIG. 6D, the operation Maximum (N1-N2, 0) is applied to each row within the two results tables to determine the final results. If the same row is seen in both inputs, the approach subtracts the second input counter from the first input counter. If the result is 0 or negative, then the row is discarded. Else, the approach will deduplicate the row as many times as the result counter for the row.

Figure 6E:
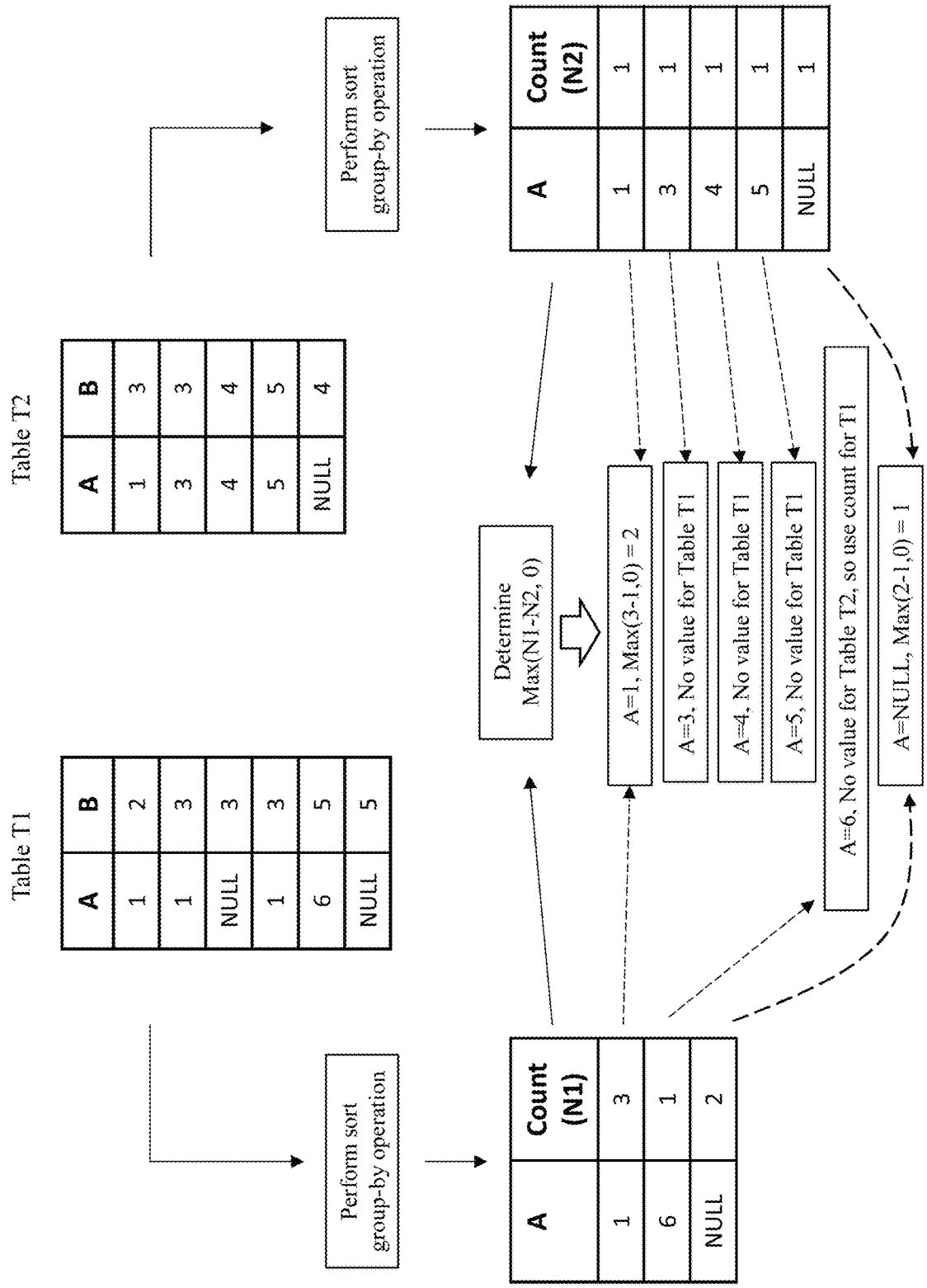

FIG. 6E illustrates the calculations from applying the MAX(N1-N2, 0) operation for the values for each table, and FIG. 6F shows the final results from applying the calculations and then deduplicating the values based upon the calculation results. Here, only values "NULL", "1", and "6" exist in column A of table T1. Therefore, the other values that only exist in T2 but not in T1 (values of "3", "4", and "5") will not produce a row in the result set.

For value "1" in column A, N1 is "3" and N2 is "1". The operation Max((N1-N2, 0) is applied as MAX((3−1=2), 0) to produce a result value of "2". This means that the value "1" should be reproduced twice in the final result set 602. Here, the final result set 602 includes two rows 604 and 606 that hold this value "1".

For value "6" in column A, N1 is "1" and N2 is "0". The operation Max((N1-N2, 0) is applied as MAX((1−0=1), 0) to produce a result value of "1". This means that the value "6" should be reproduced only once in the final result set 602. Here, the final result set 602 include one row 608 that hold this value "1".

For value "NULL" in column A, N1 is "2" and N2 is "1". The operation Max((N1-N2, 0) is applied as MAX((2−1=1), 0) to produce a result value of "1". This means that the value "NULL" should be reproduced only once in the final result set 602. Here, the final result set 602 include one row 610 that hold this value "NULL".

Some embodiments, in addition to implementation of multi-set operators, also provides an optimization to simplify queries with multiple SET operators. The strategy of this additional embodiment is to convert INTERSECT ALL and MINUS ALL to their regular SET counterparts INTERSECT and MINUS. As such, these simplification operations will serve to reduce the number of CPU instructions needed, the amount of processing memory that is consumed, and hence will result in more efficient execution of the queries.

Figure 7:
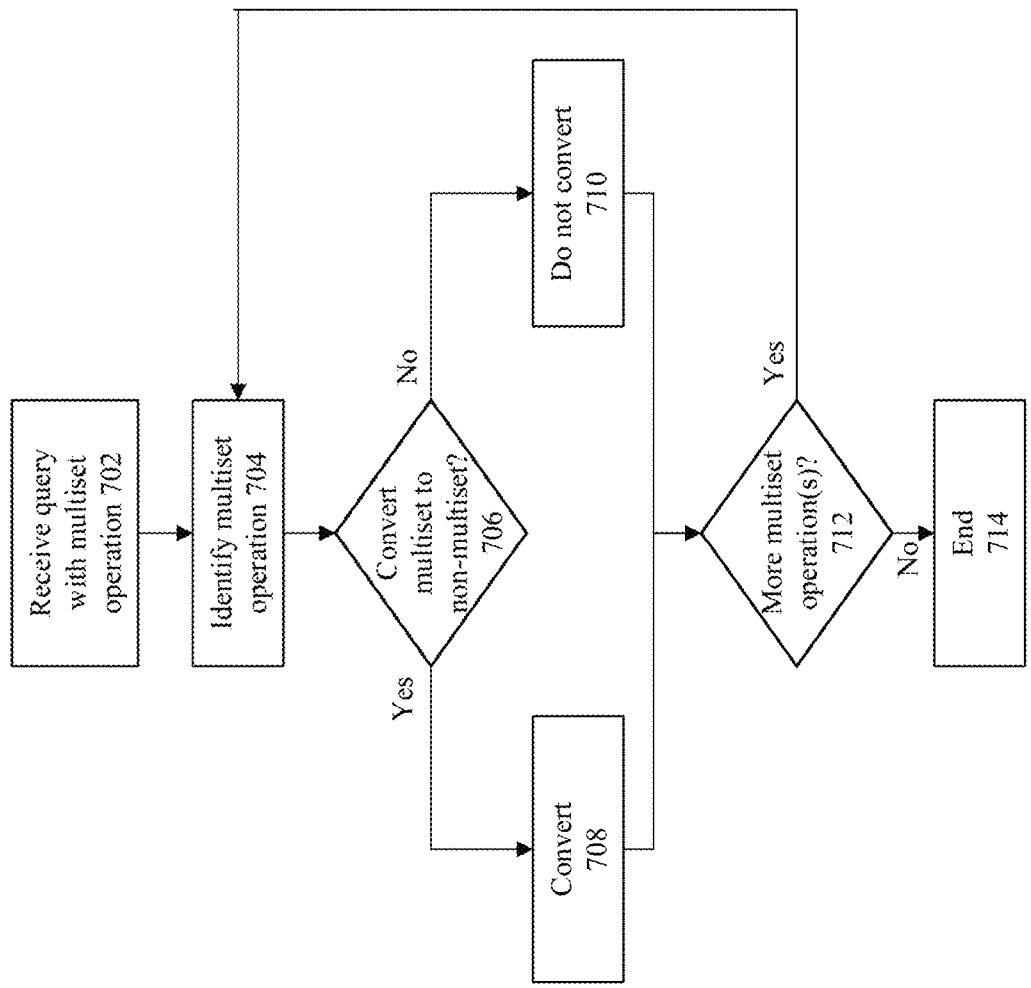
FIG. 7 shows a flowchart of an approach to optimize a multi-set semantic to a regular set semantic according to some embodiments of the invention.

FIG. 7 shows a flowchart of this approach according to some embodiments of the invention. At 702, a query is received having one or more multi-set operations. At 704, an identification is made of the specific multi-set operation currently being addressed. It is noted that different rules may be applied to handle different types of multi-set operations, and hence the specific operation needs to be identified.

At 706, a determination is made whether the multi-set operator can be converted to a non-multiset operator. The circumstance of the usage of the operator is identified, since an operation may be converted in some use cases while not being convertible in other use cases. If conversion is possible, then at step 708, the multi-set operator is converted to a non-multiset operator. If conversion is not possible, then at step 710, conversion is not applied, and the query retains the original multi-set operator.

At 712, a determination is made whether the query includes any additional multi-set operators that need to be addressed. If so, then the process returns back to step 704 to identify another multi-set operator to handle. If not, then at 714, the process ends.

Figure 8:
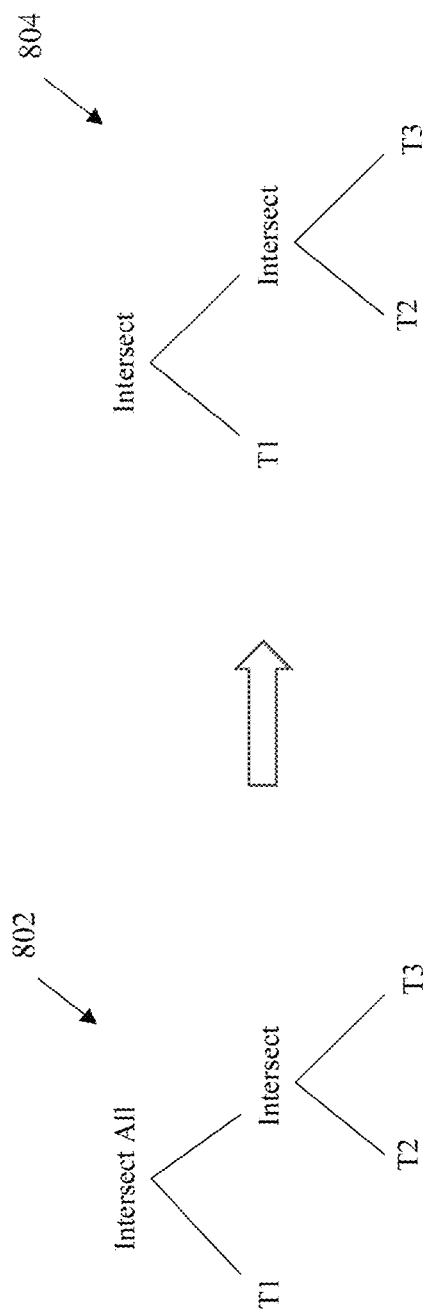
FIGS. 8, 9A-B, 10A-B, and 11A-B illustrates various example approaches to optimize a multi-set semantic to a regular set semantic.
Figure 9A:
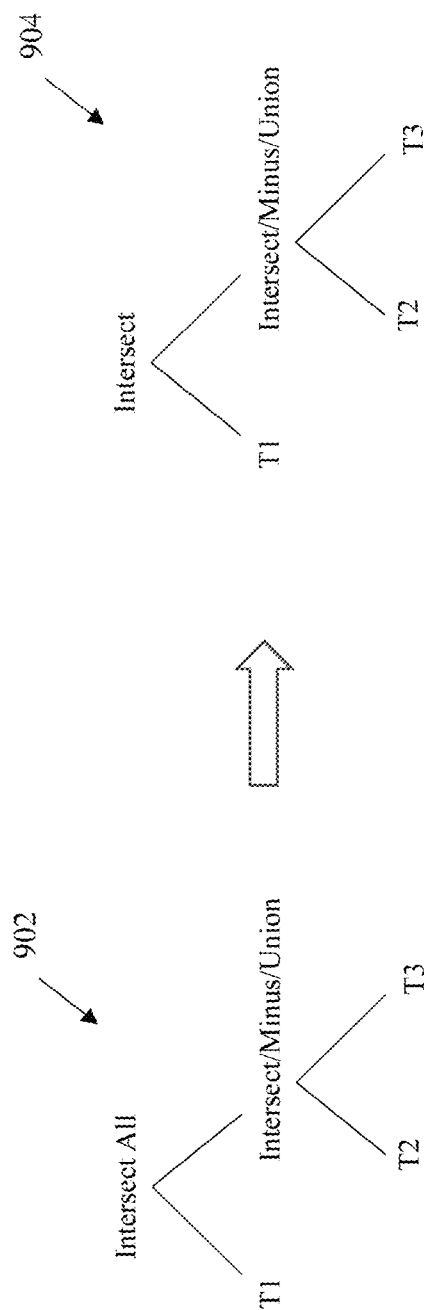
Figure 9B:
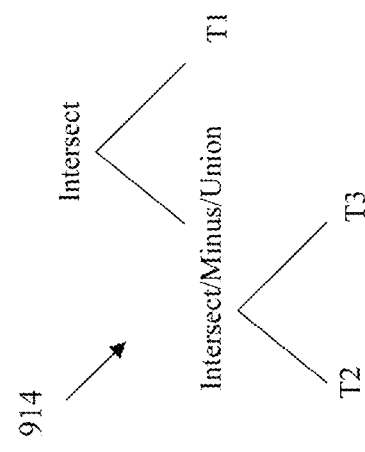
Figure 9B:
Figure 9B:
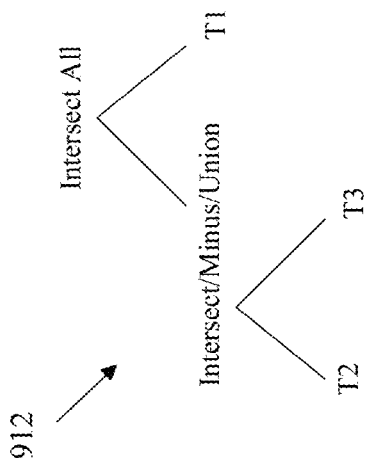

As an illustration, consider the following query:

SELECT coil FROM t1 INTERSECT ALL (SELECT coil FROM t2 INTERSECT SELECT coil FROM t3);

This query is logically illustrated as shown at 802 on the left side of FIG. 8. The subquery inside the parenthesis is actually a regular-set operation, which produce distinct rows. Therefore, if one further performs the INTERSECT ALL, since the right branch has only distinct rows, the final result must only has distinct rows. Thus, INTERSECT ALL can be simplified as INTERSECT, which gives rise to the following query (as logically illustrated at 804 on the right side of FIG. 8):

SELECT col1 FROM t1 INTERSECT (SELECT col1 FROM t2 INTERSECT SELECT coil FROM t3);

This approach can be generalized for other types of operations in the subquery that will produce distinct rows. For example, the INTERSECT ALL with either of its branches having regular-set operators (INTERSECT/MINUS/UNION) can be simplified to INTERSECT. FIGS. 9A and 9B logically illustrate these principles.

In FIG. 9A, as shown at 902, the regular-set operators (INTERSECT/MINUS/UNION) are on the right-hand side of the INTERSECT ALL operator. Since these regular-set operators will produce unique values, this means that, as shown at 904, the INTERSECT ALL operator can be changed to the INTERSECT operator without affecting the correctness of the query results.

In FIG. 9B, as shown at 912, the regular-set operators (INTERSECT/MINUS/UNION) are on the left-hand side of the INTERSECT ALL operator. Similar to what was shown in FIG. 9A, the configuration of FIG. 9B will also allow the INTERSECT ALL operator to be changed to the INTERSECT operator (as shown at 914), since the regular-set operators (INTERSECT/MINUS/UNION) on the left-hand side of the INTERSECT ALL operator will produce unique values.

It is noted that similar optimizations can be implemented for the MINUS ALL and UNION ALL operators as well. In general, it is noted that any SET operators under the scenarios described herein can be optimized to convert from a multi-set to a regular set operator.

Figure 10A:
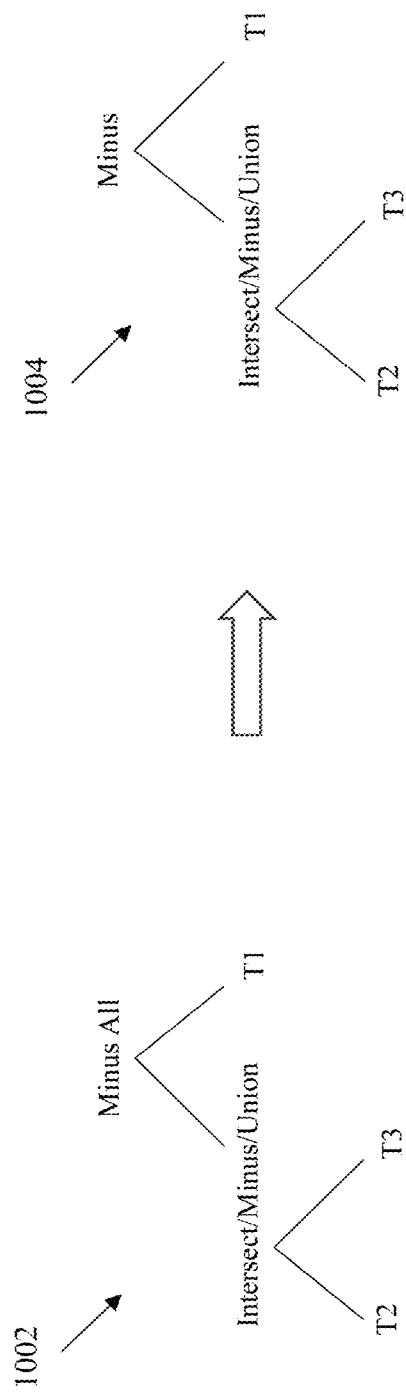

With regards to the MINUS ALL operator, if this operator has its first branch having regular-set operators, then the MINUS ALL operator can be simplified to MINUS. This scenario is logically shown in FIG. 10A. Here, at 1002, the query includes an INTERSECT/MINUS/UNION operator on the left-leg of the query. Based upon the above principle, this means that as shown at 1004, the MINUS ALL operator can be changed to the MINUS operator.

Figure 10B:
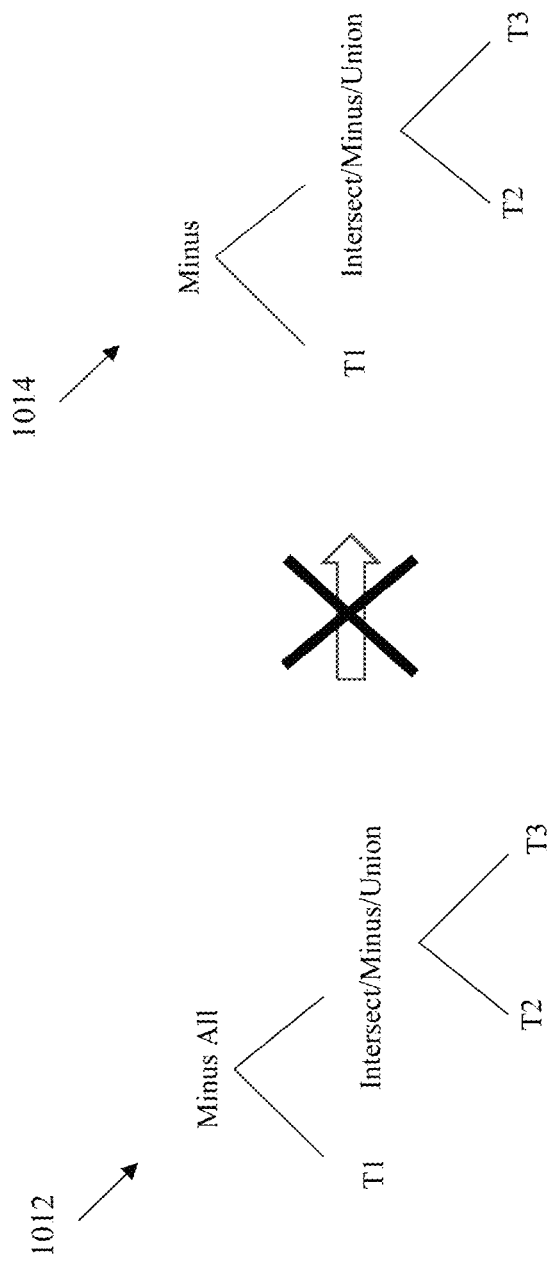

It is noted that the converse scenario does not allow this type of optimization to occur. To explain, consider the scenario of FIG. 10B, where at 1012, the query includes an INTERSECT/MINUS/UNION operator on the right-leg of the query. Because of the specific way that the MINUS ALL operator treats items on the left-leg and right-leg of the query, this means that even if there is an INTERSECT/MINUS/UNION operator is on the right-leg of the query, the MINUS ALL operator cannot be simplified to a MINUS operator in this scenario since the results will not be consistent.

Figure 11A:
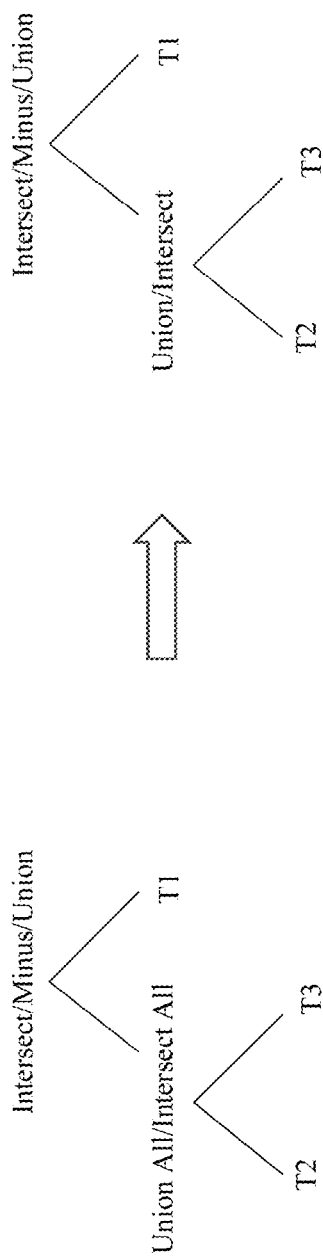
Figure 11B:
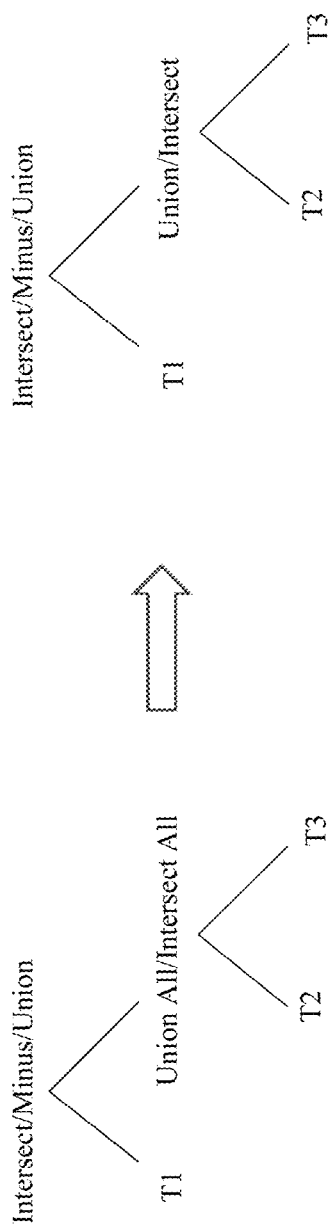

For regular-set operators, if either of the branches is UNION/INTERSECT ALL, the operator in this branch can be simplified as UNION/INTERSECT. FIGS. 11A and 11B logically illustrate this principle. FIG. 11A shows a scenario where any of the regular set operators INTERSECT/MINUS/UNION includes a UNION ALL or INTERSECT ALL operator on the left-leg. Here, the UNION ALL or INTERSECT ALL operator can be simplified into the UNION or INTERSECT operators, respectively. Similarly, FIG. 11B shows the alternate scenario where any of the regular set operators INTERSECT/MINUS/UNION includes a UNION ALL or INTERSECT ALL operator on the right-leg. Like the previous example of FIG. 11A, the UNION ALL or INTERSECT ALL operator in FIG. 11B can be simplified into the UNION or INTERSECT operators, respectively.

Figure 12A:
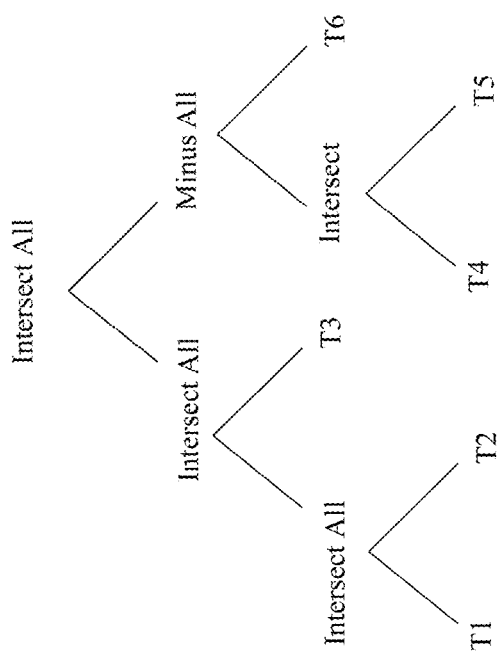
FIGS. 12A-F provides an illustration for application of the inventive technique to a complex query.

Based on the rules above, one can simplify more complicated queries with combined set operations. For example, consider a complex query having the structure shown in FIG. 12A. Here, the top level of the query is the INTERSECT ALL operator. Along the left-leg is another INTERSECT ALL operator that also has a left-leg with an INTERSECT ALL operator. The right-leg includes a MINUS ALL operator that has an INTERSECT operator along its left-leg.

By applying the above-described optimizations, it can be observed that many and/or all of the multi-set operations in the query can be simplified to regular-set operations.

Figure 12B:
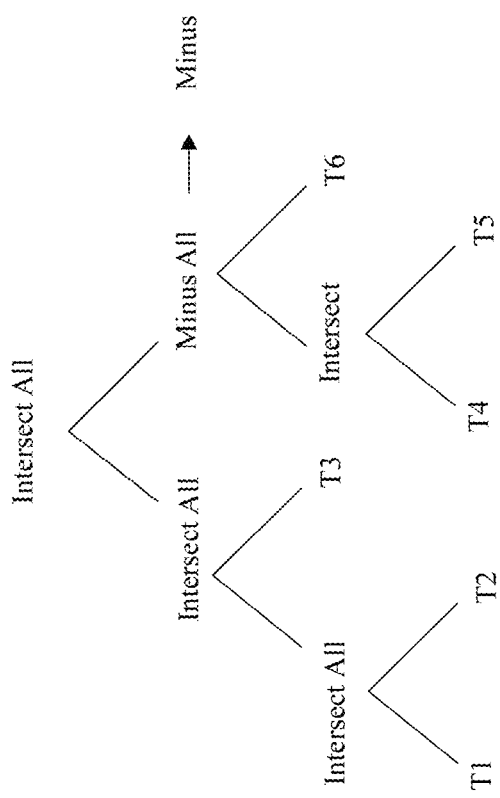

For instance, as shown in FIG. 12B, the MINUS ALL operator can be simplified to the MINUS operator. This is based upon the optimization described with respect to FIG. 10A, since there is an INTERSECT operator along its left-leg.

Figure 12C:
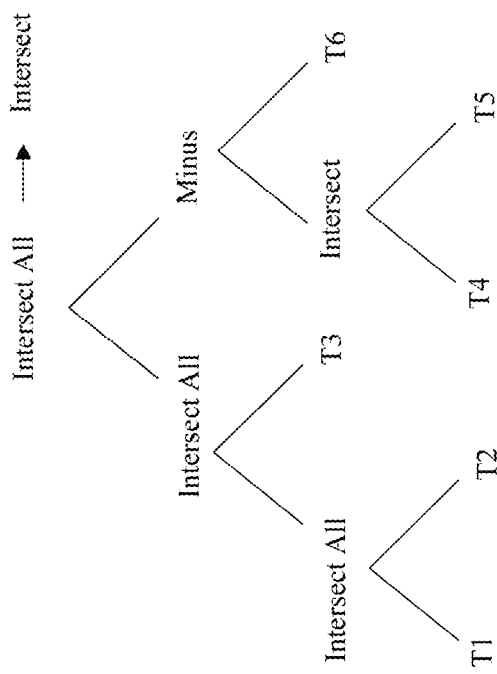

Next, as shown in FIG. 12C, the top-level INTERSECT ALL operator can be optimized into the INTERSECT operator. This is based upon the optimization described with respect to FIG. 9A, since there is now a MINUS operator along its right-leg.

Figure 12D:
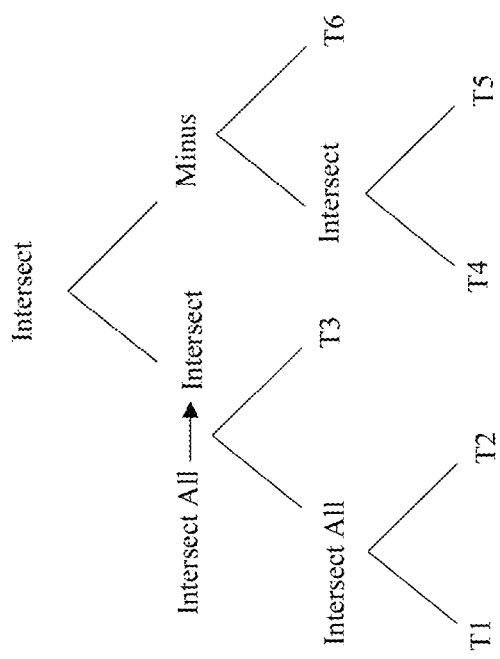

As shown in FIG. 12D, the second-level INTERSECT ALL operator can be optimized into the INTERSECT operator. This is based upon the optimization described with respect to FIG. 11A, since its parent node is now an INTERSECT operator.

Figure 12E:
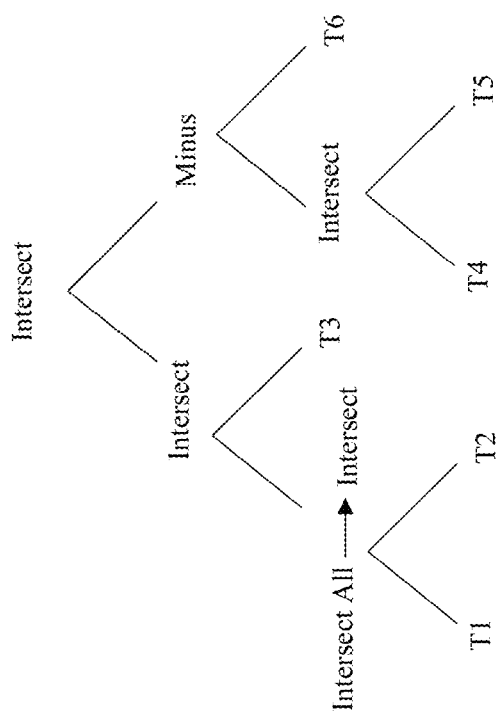

Similarly, as shown in FIG. 12E, the third-level INTERSECT ALL operator can also be optimized into the INTERSECT operator. As before, this is based upon the optimization described with respect to FIG. 11A, since the third-level INTERSECT ALL operator now has its parent node as an INTERSECT operator.

Figure 12F:
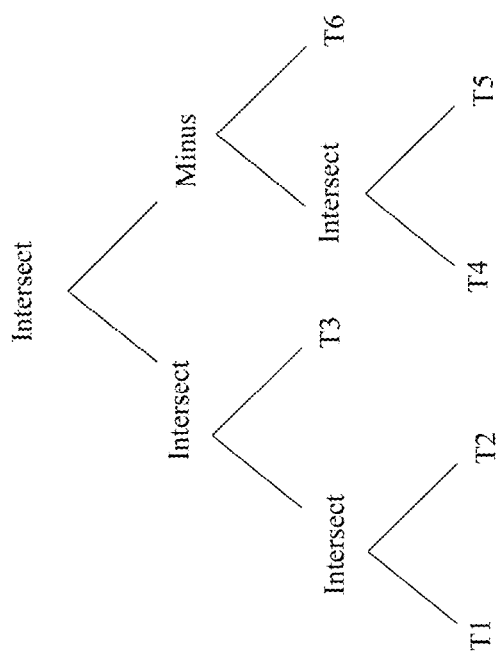

FIG. 12F now shows the final version of the query. It is noted that all of the multi-set operators has now been optimized into regular-set operators.

The various optimizations described above may be performed as either bottom-up rules or top-down rules within the query. For example, in some embodiments, the bottom-up rules may include the optimization that convert (a) INTERSECT ALL to INTERSECT (e.g., FIGS. 9A-B) and (b) MINUS ALL to MINUS (e.g., FIG. 10A). In some embodiments, the top-down rules may include (c) the optimization of FIGS. 11A-B that convert UNION ALL/INTERSECT ALL when they are child operators from a parent INTERSECT/MINUS/UNION operator. In certain embodiments, the rules for (a) and (b) are applied before the rules for (c), where the bottom-up rules are applied before the top-down rules.

Therefore, what has been described is an improved approach to implement a more efficiently approach to process multi-set operations in a database system. In some embodiments, a group-by operation, sort, and counting approach is provided to efficiently process such queries. Some embodiments also provide an approach to simplify multi-set operations into regular-set operations. Many advantages are provided by the current invention. For example, this approach can be used to remove duplicates from inputs, which serve to reduce memory/disk and CPU usage. In addition, processing of the INTERSECT ALL or MINUS ALL operations will become more efficient as this approach minimizes comparisons as well.

System Architecture Overview

Figure 13:
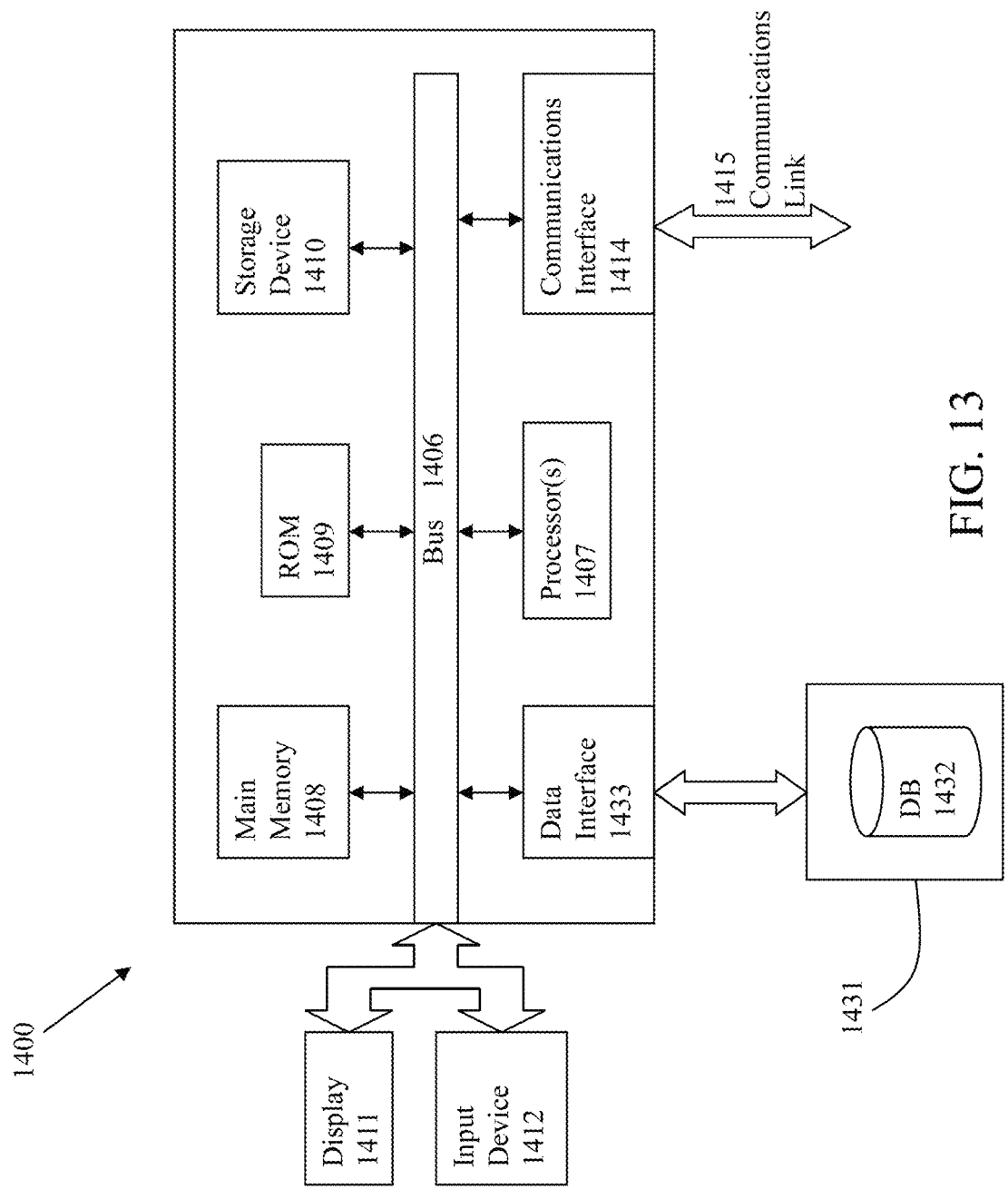
FIG. 13 is a block diagram of an illustrative computing system suitable for implementing an embodiment of the present invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 14:
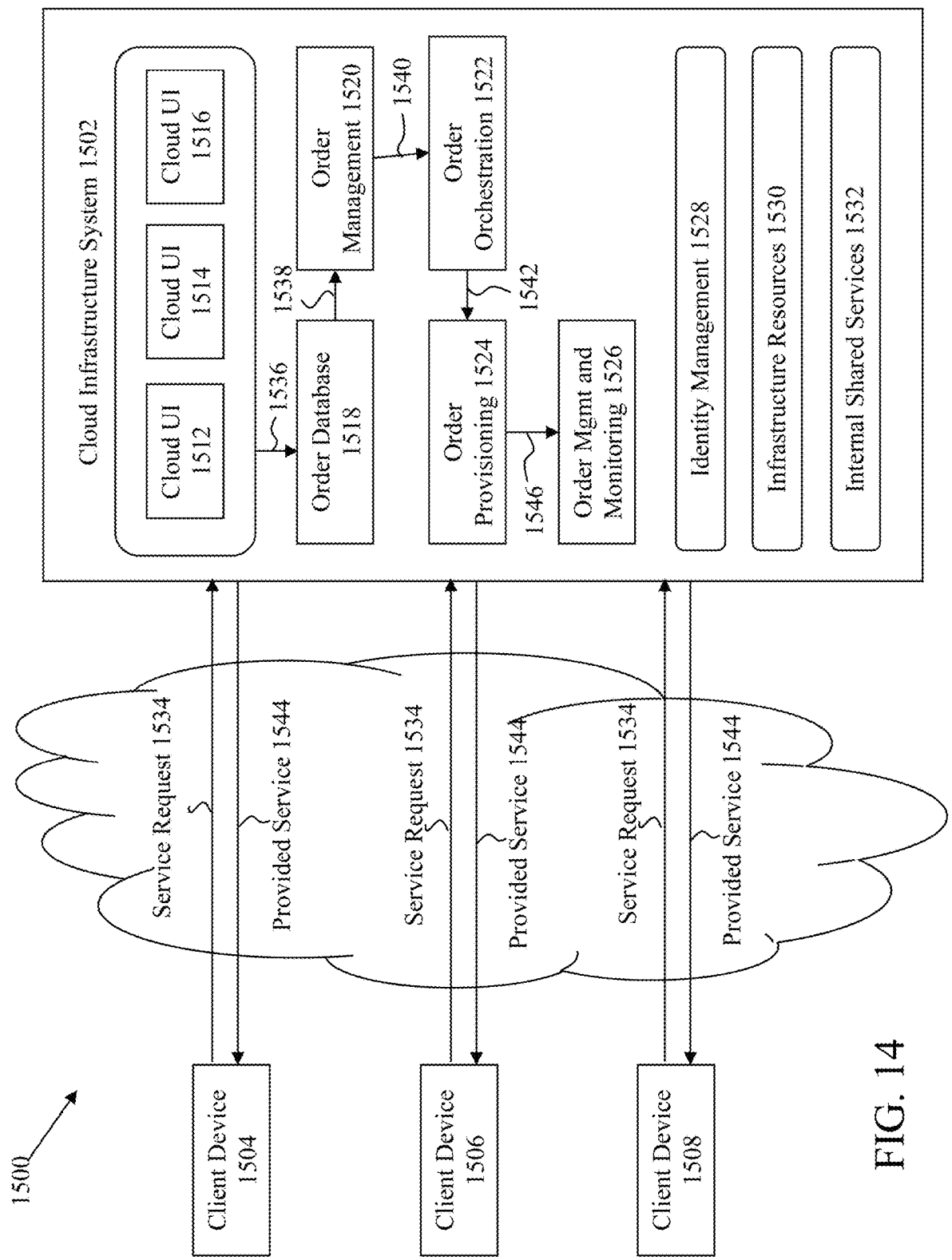
FIG. 14 is a block diagram of one or more components of a system environment in which services may be offered as cloud services, in accordance with an embodiment of the present invention.

FIG. 14 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 13. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for optimizing a database query, comprising:
   receiving a database query having a SET operator with a multi-set semantic;
   processing the SET operator in the database query into at least a first GROUP-BY operation, a second GROUP-BY operation, and a correlation operation, wherein
      the first GROUP-BY operation is performed on a first table column of a first database table referenced by the SET operator with the multi-set semantic, and a first counter for a first result associated with the first GROUP-BY operation is maintained, and
      the second GROUP-BY operation is performed on a second table column of a second database table referenced by the SET operator with the multi-set semantic, and a second counter for a second result associated with the second GROUP-BY operation is maintained;
   performing the correlation operation on the first and second counters to generate a correlation between the first result with the second result; and
   generating a result set for the SET operator based at least in part upon the correlation, wherein a total number of instances for at least a row value in the result set is determined by using at least the correlation; and generating a query result set based at least in part upon the result set for the SET operator.

2. The method of claim 1, further comprising performing the correlation operation on the first counter and the second counter using an operator that is determined based at least in part upon the SET operator, wherein the first and second GROUP-BY operations are sort GROUP-BY operations.

3. The method of claim 1, wherein the SET operator having the multi-set semantic is a MINUS ALL operator, and the first result and the second result are correlated by calculating a maximum of either zero or a difference between the first counter and the second counter.

4. The method of claim 1, wherein the SET operator having the multi-set semantic is an INTERSECT ALL operator, and the first and second results are correlated by calculating a minimum between the first counter and the second counter.

5. The method of claim 1, wherein the first and second GROUP-BY operations are hashed GROUP-BY operations respectively followed by a separate sorting operation.

6. The method of claim 1, wherein the SET operator having the multi-set semantic is converted to a regular set operator.

7. The method of claim 6, wherein at least one of the following conversions occurs in the database query: (a) INTERSECT ALL is converted to INTERSECT when a first subquery includes INTERSECT, MINUS, or UNION; (b) MINUS ALL is converted to MINUS when a second subquery includes INTERSECT, MINUS, or UNION on a left-hand branch of the database query; or (c) INTERSECT ALL is converted to INTERSECT, and MINUS ALL is converted to MINUS when a parent branch includes INTERSECT, MINUS, or UNION.

8. A system for optimizing a database query, comprising:
a processor;
a memory for holding programmable code; and
wherein the programmable code includes instructions executable by the processor for
receiving a database query having a SET operator with a multi-set semantic;
processing the SET operator in the database query into at least a first GROUP-BY operation, a second GROUP-BY operation, and a correlation operation, wherein
the first GROUP-BY operation is performed on a first table column of a first database table referenced by the SET operator with the multi-set semantic, and a first counter for a first result associated with the first GROUP-BY operation is maintained, and
the second GROUP-BY operation is performed on a second table column of a second database table referenced by the SET operator with the multi-set semantic, and a second counter for a second result associated with the second GROUP-BY operation is maintained;
performing the correlation operation on the first and second counters to generate a correlation between the first result with the second result; and
generating a result set for the SET operator based at least in part upon the correlation, wherein a total number of instances for at least a row value in the result set is determined by using at least the correlation; and
generating a query result set based at least in part upon the result set for the SET operator.

9. The system of claim 8, wherein the programmable code further includes instructions executable by the processor for performing the correlation operation on the first counter and the second counter using an operator that is determined based at least in part upon the SET operator, and the first and second GROUP-BY operations are sort GROUP-BY operations.

10. The system of claim 8, wherein the SET operator having the multi-set semantic is a MINUS ALL operator, and the first and the second results are correlated by calculating a maximum of either zero or a difference between the first counter and the second counter.

11. The system of claim 8, wherein the SET operator having the multi-set semantic is an INTERSECT ALL operator, and the first and the second results are correlated by calculating a minimum between the first counter and the second counter.

12. The system of claim 8, wherein the first and second GROUP-BY operations are hashed GROUP-BY operations respectively followed by a separate sorting operation.

13. The system of claim 8, wherein the SET operator having the multi-set semantic is converted to a regular set operation.

14. The system of claim 13, wherein at least one of the following conversions occur in the database query: (a) INTERSECT ALL is converted to INTERSECT when a first subquery includes INTERSECT, MINUS, or UNION; (b) MINUS ALL is converted to MINUS when a second subquery includes INTERSECT, MINUS, or UNION on a left-hand branch of the database query; or (c) INTERSECT ALL is converted to INTERSECT, and MINUS ALL is converted to MINUS when a parent branch includes INTERSECT, MINUS, or UNION.

15. A computer program product embodied on a non-transitory computer readable medium, the non-transitory computer readable medium having stored thereon a sequence of instructions which, when executed by a processor, executes a set of acts for optimizing a database query, the set of acts comprising:
receiving a database query having a SET operator with a multi-set semantic;
processing the SET operator in the database query at least a first GROUP-BY OPERATION, a second GROUP-BY operation, and a correlation operation, wherein
the first GROUP-BY operation is performed on a first table column of a first database table referenced by the SET operator with the multi-set semantic, and a first counter for a first result associated with the first GROUP-BY operation is maintained, and
the second GROUP-BY operation is performed on a second table column of a second database table referenced by the SET operator with the multi-set semantic, and a second counter for a second result associated with the second GROUP-BY operation is maintained;
performing the correlation operation on the first and second counters to generate a correlation between the first result with the second result; and
generating a result set for the SET operator based at least in part upon the correlation, wherein a total number of instances for at least a row value in the result set is determined by using at least the correlation; and
generating a query result set based at least in part upon the result set for the SET operator.

16. The computer program product of claim 15, wherein the set of acts further comprises performing the correlation operation on the first counter and the second counter using an operator that is determined based at least in part upon the SET operator, and the first and second GROUP-BY operations are sort GROUP-BY operations.

17. The computer program product of claim 15, wherein the SET operator having the multi-set semantic is a MINUS ALL operator, and the first result and the second result are correlated by calculating a maximum of either zero or a difference between the first counter and the second counter.

18. The computer program product of claim 15, wherein the SET operator having the multi-set semantic is an INTERSECT ALL operator, and the first result and the second result are correlated by calculating a minimum between the first counter and the second counter.

19. The computer program product of claim 15, wherein the first and second GROUP-BY operations are hashed GROUP-BY operations respectively followed by a separate sorting operation.

20. The computer program product of claim 15, wherein the SET operator having the multi-set semantic is converted to a regular set operation.

21. The computer program product of claim 20, wherein at least one of the following conversions occur in the database query: (a) INTERSECT ALL is converted to INTERSECT when a first subquery includes INTERSECT, MINUS, or UNION; (b) MINUS ALL is converted to MINUS when a second subquery includes INTERSECT, MINUS, or UNION on a left-hand branch of the database query; or (c) INTERSECT ALL is converted to INTERSECT and MINUS ALL is converted to MINUS when a parent branch includes INTERSECT, MINUS, or UNION.

* * * * *